US010963573B2

(12) United States Patent
Chan

(10) Patent No.: US 10,963,573 B2
(45) Date of Patent: Mar. 30, 2021

(54) METHOD OF SHARING A CONFIGURATION FILE

(71) Applicant: KYE SYSTEMS CORP., New Taipei (TW)

(72) Inventor: Chi-Wai Chan, New Taipei (TW)

(73) Assignee: KYE SYSTEMS CORP., New Taipei (TW)

(*) Notice: Subject to any disclaimer, the term of this patent is extended or adjusted under 35 U.S.C. 154(b) by 300 days.

(21) Appl. No.: 16/198,623

(22) Filed: Nov. 21, 2018

(65) Prior Publication Data
US 2020/0143063 A1 May 7, 2020

(30) Foreign Application Priority Data

Nov. 1, 2018 (CN) .......................... 201811292838.7

(51) Int. Cl.
G06F 21/60 (2013.01)
G06F 16/176 (2019.01)
H04L 9/30 (2006.01)
H04L 9/14 (2006.01)
H04L 9/08 (2006.01)
H04L 29/08 (2006.01)

(52) U.S. Cl.
CPC .......... *G06F 21/602* (2013.01); *G06F 16/176* (2019.01); *H04L 9/0866* (2013.01); *H04L 9/14* (2013.01); *H04L 9/30* (2013.01); *H04L 67/34* (2013.01); *H04L 67/06* (2013.01)

(58) Field of Classification Search
CPC .... G06F 21/602; G06F 16/176; G06F 21/572; G06F 21/60; H04L 9/30; H04L 9/0866; H04L 67/34; H04L 9/14; H04L 67/06; H04L 67/10; H04L 63/0442; H04L 67/30; H04L 67/1097; H04L 9/08; H04L 29/08
See application file for complete search history.

(56) References Cited

U.S. PATENT DOCUMENTS

| | | | | |
|---|---|---|---|---|
| 9,069,436 | B1* | 6/2015 | Fieweger | G06F 16/9535 |
| 2011/0197255 | A1* | 8/2011 | DiCrescenzo | H04L 63/0407 |
| | | | | 726/1 |
| 2012/0134491 | A1* | 5/2012 | Liu | H04L 67/1097 |
| | | | | 380/28 |
| 2015/0052442 | A1* | 2/2015 | Li | H04L 41/22 |
| | | | | 715/735 |
| 2018/0076957 | A1* | 3/2018 | Watanabe | G06Q 20/3829 |
| 2019/0173873 | A1* | 6/2019 | Brown | H04L 63/0823 |
| 2019/0228133 | A1* | 7/2019 | Ansari | H04L 9/3239 |
| 2019/0281449 | A1* | 9/2019 | Luo | H04L 9/3268 |

* cited by examiner

Primary Examiner — Alexander Lagor
Assistant Examiner — Quazi Farooqui
(74) Attorney, Agent, or Firm — Maschoff Brennan

(57) ABSTRACT

A method for sharing a configuration file is applicable to a first host and a second host that are connected to a network, wherein the first host is electrically connected to the first peripheral device, and the second host is electrically connected to the second peripheral device. The method for sharing a configuration file includes: the first host starts the embedded program, and after obtaining the first public key of the first peripheral device, the embedded program is communicatively connected to a server, and the device requests a private key according to the first public key. After obtaining the private key, the embedded program uploads a configuration file, and the second host starts the embedded program.

10 Claims, 3 Drawing Sheets

METHOD OF SHARING A CONFIGURATION FILE

RELATED APPLICATIONS

This application claims priority to China Application CN, 201811292838.7, filed on Nov. 1, 2018, which is incorporated by reference herein in its entirety.

BACKGROUND

Technical Field

The present disclosure is related to a method of sharing files in the cloud platform, in particular to a method of sharing a configuration file in the cloud platform.

Related Art

As the user operates the computer for a longer period of time, the factors affecting the user experience are the user's adaptability to the peripheral device in addition to the computing speed of the computer itself. In other words, whether a conventional computer peripheral device such as a mouse or a keyboard can match the user's own usage habits. Most of the computer peripherals commonly used today offer options for user customization, such as the mouse's dots per inch (DPI) setting, wheel speed, cursor movement speed, webcam image effects, resolution, brightness, night vision or focus settings . . . etc. However, considering the scenario where the user needs to work in a different place, although the file to be processed can be accessed on another computer host through the cloud backup technology, for the peripheral device, if it is only for non-recurring work in the remote place, Carrying the usual computer peripherals will still bring a lot of inconvenience to the user. In addition, even if the user carries the computer peripheral device with them, when these devices are connected to different computer hosts, the user still needs to reload the configuration file corresponding to the peripheral devices of the computer, which obviously consumes the user extra time and effort.

SUMMARY

In view of this, the present disclosure provides a method for sharing a configuration file, which provides a user with access and sharing of configuration files of a personalized computer peripheral device via a cloud platform and an embedded program.

The method for sharing a configuration file according to an embodiment of the present disclosure is applicable to a first host and a second host that are communicatively connected to a network, wherein the first host is electrically connected to the first peripheral device, and the method for the second the host to be electrically connected to the shared configuration file described by the second peripheral device includes: the first host starts the embedded program. The embedded program obtains the first public key of the first peripheral device. After obtaining the first public key the embedded program communicatively connected to the server. After the communicatively connected to the server, the embedded program requests the private key from the server according to the first public key; after obtaining the private key, the embedded program uploads a configuration file. After obtaining the private key, the second host starts the embedded program, and the embedded program obtains the second public key of the second peripheral device. After obtaining the second public key, the embedded program selectively uses the private key or the second public key communicatively connected to the server; And after the second host communicatively connected to the server, the embedded program of the second host downloads the configuration file. The first public key is a hardware identification code of the first peripheral device, and the second public key is another hardware identification code of the second peripheral device. The two hardware identification codes each have a product identification code and a supplier identification code.

The method for sharing a configuration file according to an embodiment of the present disclosure, wherein before the embedded program uploads the configuration file, the method further includes: the embedded program running on the first host sets a shared attribute for the configuration file, and uploads in the embedded program. After the configuration file is configured, when the configuration file does not have a shared attribute, the server stores the configuration file in a private area; when the configuration file has a shared attribute, the server stores the configuration file in a public area and a private area.

The method for sharing a configuration file according to an embodiment of the present disclosure, wherein after the embedded program running on the first host obtains the first public key, the method further includes: the embedded program confirming whether the first public key exists in the identification code list; when the first public key exists in the identification code list, the embedded program is communicably connected to the server by the embedded program; when the first public key does not exist in the identification code list, the embedded program is ended. After the embedded program running on the second host obtains the second public key, the method further includes: the embedded program confirms whether the second public key exists in the identifier list; when the second public key exists in the identifier list, the embedded program communicatively connected to the server; when the second public key does not exist in the identification code list, the embedded program ends. The above description of the disclosure and the following description of the embodiments of the present disclosure are intended to illustrate and explain the spirit and principles of the invention, and can give a further explain of the present disclosure.

The method for sharing a configuration file according to an embodiment of the present disclosure, after the embedded program is communicably connected to the server according to the private key, further includes: the server providing a configuration file list, where the configuration file list is stored in the at least one configuration file of the public area. The method for sharing a configuration file according to another embodiment of the present disclosure, after the embedded program is communicably connected to the server according to the second public key, further includes: the server provides configuration according to the product identification code of the second public key. The configuration file list includes a plurality of custom configuration files and at least one default configuration file, and the custom configuration file and the default configuration file are applicable to the second peripheral device. The first peripheral device and the second peripheral device are a keyboard, a mouse, a touch pad or a webcam.

With the above architecture, the method for sharing a configuration file disclosed by the present disclosure can be matched with a corresponding smart series product (such as a computer peripheral device such as a keyboard, a mouse, a network camera, etc.) through a specific embedded program or APP at any time. And the cloud server can upload and download the personalized computer peripheral configuration file at any time, and can selectively share the customized configuration file to other users via the cloud server. Therefore, the convenience of "A land upload, B download" is achieved.

The above description of the disclosure and the following description of the embodiments of the present disclosure are intended to illustrate and explain the spirit and principles of the invention.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
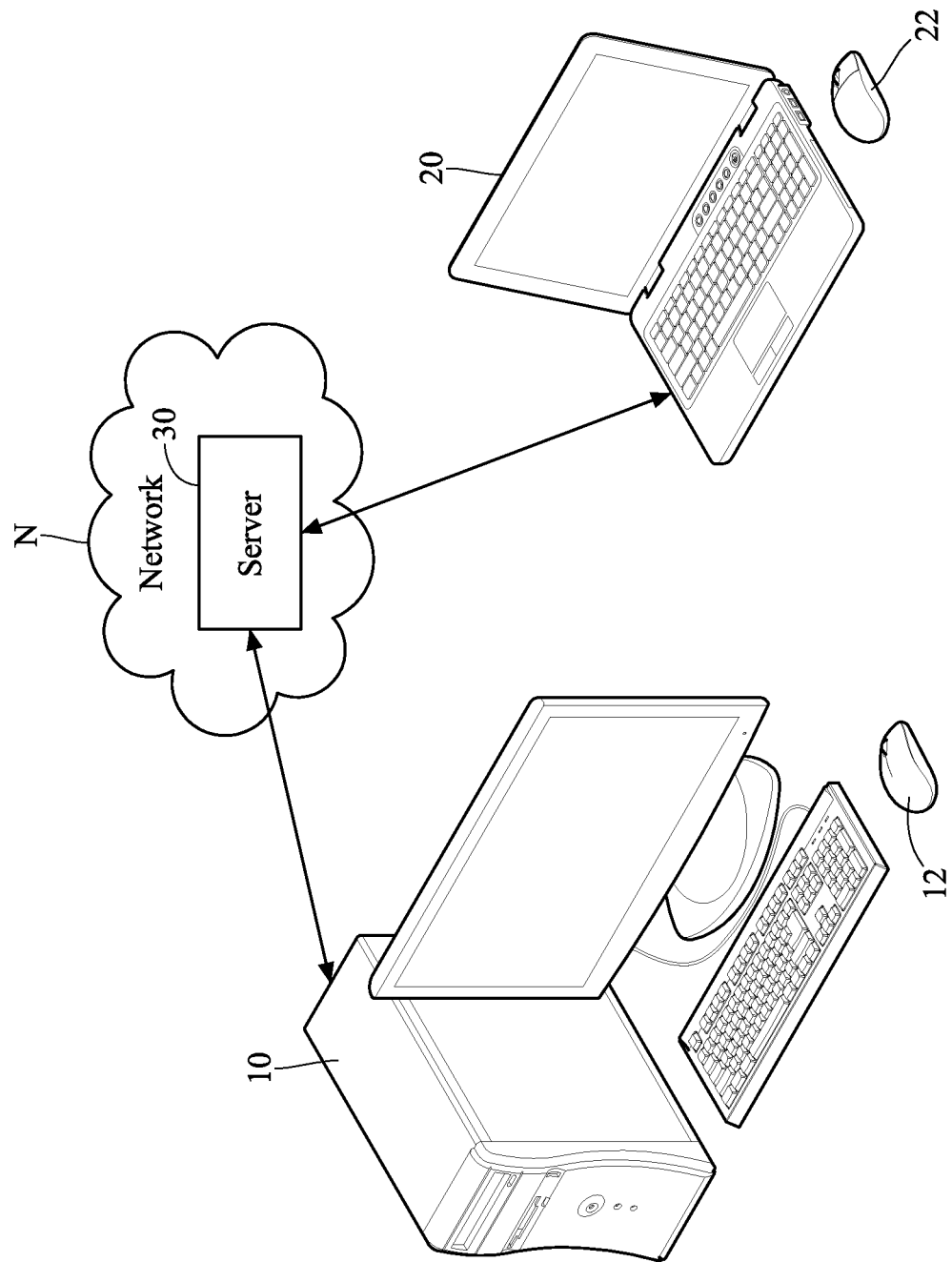
FIG. 1 is a schematic diagram of a hardware connection method applicable to a shared configuration file method according to an embodiment of the disclosure.

Please refer to FIG. 1, which is a schematic diagram of hardware connections applicable to a method for sharing a configuration file according to an embodiment of the present disclosure. As shown in FIG. 1, the first host 10 and the second host 20 are both communicably connected to a server 30 established by the factory in the network N. The first host 10 is electrically connected to the first peripheral device 12 and the second host 20 is electrically connected to the second peripheral device 22. The first peripheral device 12 and the second peripheral device 22 are computer peripheral devices, such as a keyboard, a mouse, a touch pad or a web camera, etc., and the mouse is taken as an example in FIG. 1, but the present disclosure The hardware types of the first peripheral device 12 and the second peripheral device 22 are not limited, and it is also noted that the user considers that the user carries the first peripheral device 12 and electrically connects the second peripheral device 20 to the second host 20. In the context, the second peripheral device 22 can also be the first peripheral device 12.

Figure 2:
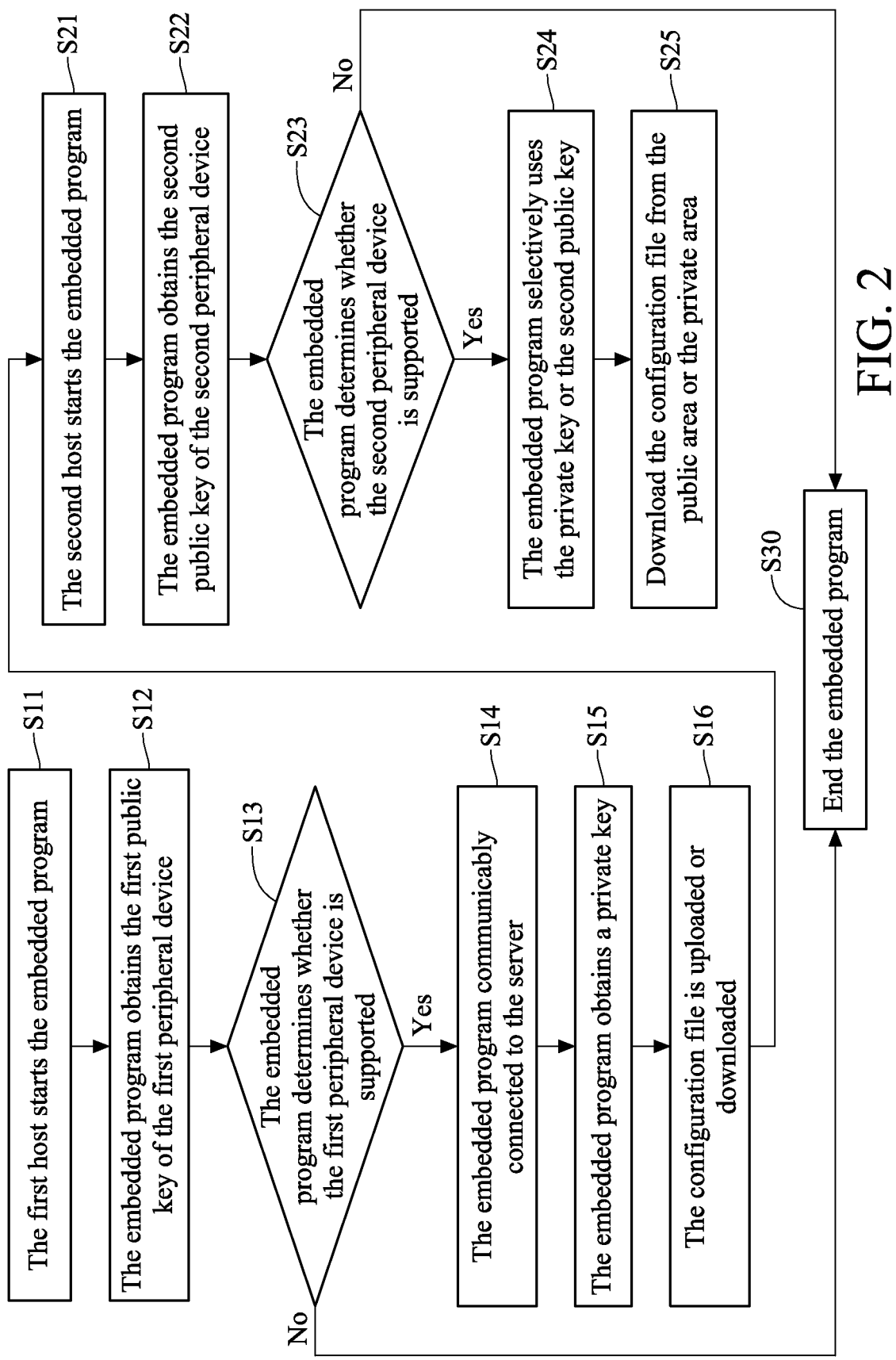
FIG. 2 is a flow chart of a method for sharing a configuration file according to an embodiment of the disclosure.

Please refer to FIG. 2, which is a flowchart of a method for sharing a configuration file according to an embodiment of the present disclosure. First, referring to step S11, the first host 10 starts the embedded program. The embedded program is, for example, a driver that has been built into the computer or an application software that needs to be installed separately. The installation method is, for example, installation via a CD, and USB OTG (on-the-go) through the keyboard installation; download and install from the original website; or download and install in the form of APP (Application). After the computer is turned on, the startup of the embedded program can be automatic or manual. The former is, for example, an embedded program that is started when the work system is loaded, or detects that the first peripheral device 12 is automatically activated after being connected to the computer; the latter is, for example, a user pressing a specific button on the keyboard (a single button on a specifying the keyboard or a combination of buttons formed by a plurality of buttons on a general keyboard) or by clicking the mouse to open the embedded program. In addition, when the embedded program is executed, the user can change it to not to start (do not execute) at any time, or further uninstall the embedded program.

Referring to step S12, the embedded program obtains the first public key of the first peripheral device 12. In practice, the first public key is a hardware identification code (or serial code) of the first peripheral device 12, and the hardware identification code (or serial code) is used to identify the device type of the first peripheral device 12. And manufacturers, for example, include Product ID (PID) and Vendor ID (VID).

Referring to step S13, the embedded program determines whether the first peripheral device 12 is supported by itself. In detail, after the step S12, that is, the embedded program running on the first host 10 obtains the first public key, the embedded program checks whether the identification code list has the hardware identifier of the first public key. Thereby, it is judged whether the first peripheral device 12 currently connected to the first host 10 is from a supported manufacturer and belongs to a supported product type. The identifier list may be built in an embedded program, or connected by an embedded program to a network download, or a specific server located on the network, and the embedded public key is uploaded by the embedded program. Then, the judgment result of the specific server reply is obtained. In an embodiment of the present disclosure, the manner in which the identification code list is obtained is not excessively limited.

In step S13, when the hardware identification code exists in the identification code list, the first peripheral device 12 is supported. Therefore, as shown in step S14, the embedded program can be communicably connected to the server 30 shown in FIG. On the other hand, if the hardware identification code does not exist in the identification code list, the embedded program is ended, as shown in step S30. In practice, before the embedded program ends in step S30, the status panel may be further displayed on a screen, thereby prompting the user to connect to the first host 10 using the supported first peripheral device 12.

Referring to FIG. 1 and step S14 of FIG. 2, the first public key is obtained in step S12, and after confirming that the first public key does exist in the identification code list, the embedded operation on the first host 10 is performed after step S13. The program can be communicatively connected to a predetermined server that is preset by itself, such as the server 30 shown in FIG. The server 30 is configured to provide a private cloud or a hybrid cloud for the user to store or download a configuration file for controlling the first peripheral device 12.

Referring to step S15, after the first host 10 is communicably connected to the server, the embedded program obtains a private key from the server according to the first public key. The method of obtaining is, for example, the user registers with the background management system of the server 30 through the embedded program. The method includes: filling out the system form, and uploading the first public key of the first peripheral device 12 that the user is using to the background management system. After the background management system automatically confirms the relevant data and verifies that the first public key is legal, a private key is assigned to the user, and the private key is the user's ID. The basic condition for requesting a private key is that the first peripheral device 12 held by the user has a supported first public key. The private key provides the user with a limited amount of cloud storage space, and then opens the permission to upload or download the configuration file, the details of which are detailed later.

Referring to step S16, the configuration file is uploaded or downloaded, and the configuration file includes, for example, a custom configuration file and at least one preset configuration file. In detail, after the embedded program obtains the private key in step S15, the user can upload or download a configuration file through the graphic interface provided by the embedded program. The configuration file is a "program package" provided by the embedded program for controlling the first peripheral device 12, for example, a "key function setting" of a designated button on a keyboard or a mouse, "lighting/backlight display mode", mouse DPI value, wheel speed or cursor movement speed, network camera image effect, resolution, brightness, night vision function or focus setting . . . etc.

Figure 3:
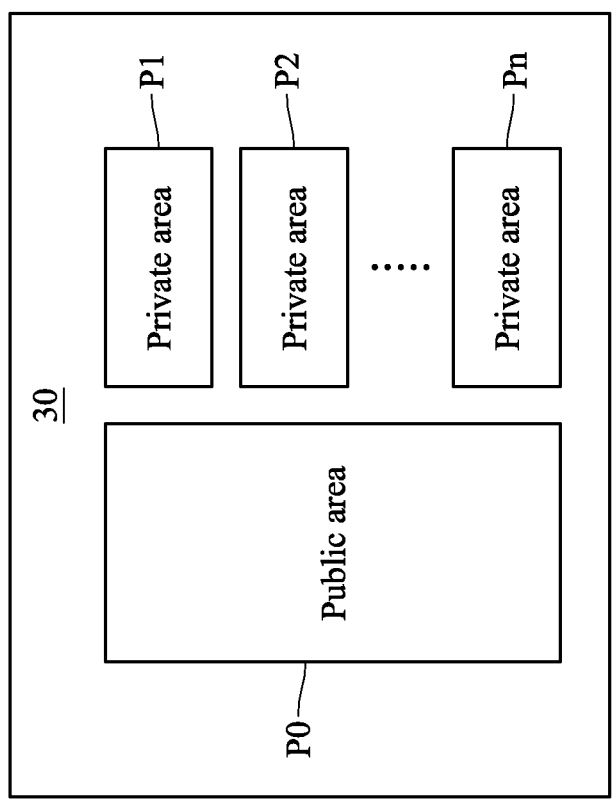
FIG. 3 is a schematic diagram of a storage space of a server according to an embodiment of the disclosure.

Please refer to FIG. 3, which is a schematic diagram of cloud storage space allocation provided by the server 30 of FIG. 1 to a user. As shown in FIG. 3, the storage space is divided into a common area P0 and a plurality of private areas P1, P2, . . . , Pn. The public area P0 is maintained by the system administrator. The system administrator sorts, uploads, or removes different types of products and different types of products through the background management system. Such as general-type products, video games or special purposes . . . etc.

The user can access (uploading or downloading) the configuration file by using the first public key to the public area P0, or access the personal area P1~Pn corresponding to the private key by using the private key (uploading or downloading) the configuration file; when the user communicably connects to the server 30 only through the first public key, the user can only access the configuration file in the public area. In detail, before the configuration file is uploaded by the embedded program, the embedded program run by the user on the first host 10 operates to selectively set a shared attribute for the configuration file to be uploaded. When uploading the configuration file to the server 30, if the configuration file does not have a sharing attribute, the server 30 stores the configuration file in a private area such as P1. On the other hand, if the configuration file has a shared attribute, the server 30 stores the configuration file in both the public area P0 and the private area P1. The configuration file stored in the public area shall be supervised and managed by the system administrator of the server 30. If necessary, the system administrator also checks and evaluates the configuration file uploaded by the user according to the contract agreement agreed upon by the user when registering. Unauthorized configuration files (such as computer viruses) are removed from the shelf to prevent other users from downloading configuration files that are defective or incompatible.

How to upload the configuration file applicable to the first peripheral device 12 on the first host 10 to the server 30 has been described in steps S11 to S16 of FIG. Next, in steps S21 to S25, how to download the previously uploaded configuration file through the second host 20 is explained.

Referring to step S21 of FIG. 2, the second host 20 starts the embedded program. After the user obtains the private key in step S15, the embedded program can be installed and started on the second host 20. The second host 20 and the first host 10 are different hardware devices, such as computer hosts in different geographical locations. Basically, this step is equivalent to step S11, the only difference being that the host running the embedded program is changed from the first host 10 to the second host 20.

Referring to step S22, the embedded program obtains the second public key of the second peripheral device 22. Basically, this step is equivalent to step S12, except that the connected second peripheral device 22 is not necessarily the same as the first peripheral device 12 (different models or different products). Of course, the user can also carry the first one. The geographic location of the peripheral device 12 to the second host 20 should be considered as the first peripheral device 12 at this time. The second public key obtained by the embedded program in this step S22 is substantially the same as the first public key of the first peripheral device 12, that is, the second public key is the hardware identification code (or serial code) of the first peripheral device 12.

Referring to step S23, the embedded program determines whether the second peripheral device 22 is supported. Specifically, the embedded program checks whether the second public key exists in the identification code list, thereby determining whether the second peripheral device 22 currently connected to the second host 20 is from a supported manufacturer and belongs to a type of supported product. Basically, this step is equivalent to step S13, and the difference is that in this step S23, the embedded program that performs the determination runs on the second host 20, and the target of the determination is the second peripheral device 22.

If the embedded program determines that the second peripheral device 22 connected to the second host 20 is not supported in step S23, the process proceeds to step S30 to end the embedded program. On the other hand, when the second public key exists in the identification code list, that is, when the embedded program supports the second peripheral device 22, the process moves to step S24, and the embedded program selectively uses the private key or the second public key. The key communicably connected to the server 30.

The private key is the user ID, and the user who owns the private key is equivalent to having a private area (for example, P1) on the server 30 for uploading, downloading, and setting sharing rights. The first public key or the second public key only opens the user's download permission for the public area.

Please refer to step S25, download the configuration file from the public area or the private area. After the embedded program is communicably connected to the server 30 according to the second public key, the user can obtain a configuration file list including at least one configuration file, which may upload and set the file attribute for sharing by himself or others. In addition, the server 30 may further provide a filtered configuration file list according to the product identification code of the second public key, where the plurality of custom configuration files and at least one preset configuration file are included, and the configuration files are applicable to the second configuration file of the peripheral device 22. The custom configuration file is set and set as a publicly shared configuration file according to the preference mode or usage habit of the second peripheral device 22, so that any user can download and use it from the public area. The preset configuration file is a configuration file provided by the manufacturer of the second peripheral device 22, and substantially at least one preset configuration file is built in when the second peripheral device 22 is shipped from the factory.

As described above, after the embedded program running on the second host 20 is communicably connected to the server 30 according to the private key, the configuration file list provided by the server 30 may include multiple configuration files stored in the public area and custom configuration file for private areas. This private area is restricted to users with private keys. The user can use the configuration file set by the first peripheral device 12 on the first host 10 to easily use the same configuration file, to achieve a seamless user experience on the second host 20 through the configuration file sharing method introduced in an embodiment of the present disclosure. The user can also set the shared configuration file of the private area according to personal preferences, thereby achieving the function of communicating with each other on the network.

Similarly, when the user electrically connects the first peripheral device 12 and the second host device 20 (for example, when the user drives the first peripheral device 12 for business travel, the user first separates a host 10 electrically separates the first peripheral device 12, and then the first peripheral device 12 is electrically connected to the second host 20). After the second host 20 starts the embedded program, the second host 20 determines the relevant steps and steps. The manner in which the second host 20 determines the second peripheral device 22 is substantially the same; that is, the embedded program assigned to the second host 20 determines whether to support the first peripheral device based on the first public key obtained from the first peripheral device 12. 12, and then communicably connected to the server 30 according to the first public key to access the public area P0; further, if the user inputs the private key, one of the private area P1 . . . Pn corresponding to the private key can be entered (for example, P1).

In summary, according to the configuration file sharing method introduced in an embodiment of the present disclosure, the user can use the public area on the server to download the configuration file as long as the user holds the first public key. The downloaded configuration file may be a preset configuration file provided by the system administrator, or may be a custom configuration file shared by other users. When the user "holds" the private key at the same time, the private area on the server corresponding to the private key can be further used to upload, download or set the shared attribute of the custom configuration file. The term "simultaneous holding" as used herein refers to any first public key (such as the aforementioned first public key or second public key) plus a specified private key. In other words, the private key is a necessary condition for unique access to the private area on the server, and the first public key (or second public key) is an adjunct condition. Based on the above mechanism, the user can download and install the embedded program described in one embodiment of the present disclosure on any computer host, and electrically connect the computer peripheral device having the specific hardware identification code (or specific serial number) to The host computer then runs the embedded program on the host computer and logs in to the cloud server through the private key. Then the user can share the configuration file for two-way communication, and then implement the configuration file for the configuration file of the computer peripheral device. The function of inputting, accessing the ground.

What is claimed is:

1. A method of sharing a configuration file, which is applicable to a first host and a second host that are connected to a network, wherein the first host is electrically connected to a first peripheral device, and the second host is electrically connected to a second peripheral device, the method for sharing the configuration file comprises:

starting an embedded program with the first host;

obtaining a first public key of the first peripheral device by the embedded program;

connecting the embedded program communicatively to a server after obtaining the first public key;

obtaining a private key from the server by the embedded program according to the first public key after the first host is communicatively connected to the server;

uploading or downloading a configuration file by the embedded program after the first host is communicatively connected to the server, wherein the configuration file is used to control the first peripheral device;

starting the embedded program with the second host after obtaining the private key;

obtaining a second public key of the second peripheral device by the embedded program;

selectively connecting to the server according to the private key or the second public key by the embedded program after obtaining the second public key; and downloading the configuration file by the embedded program after the second host is communicatively connected to the server;

wherein before uploading the configuration file by the embedded program, setting a sharing attribute to the configuration file by using the embedded program running on the first host; and after the embedded program uploads the configuration file, storing the configuration file in a private area by the server when the configuration file does not have the sharing attribute, storing the configuration file in a common area and the private area by the server when the configuration file has the sharing attribute;

wherein the first public key is a hardware identification code of the first peripheral device, and the second public key is an another hardware identification code of the second peripheral device, and the hardware identification code and the another hardware identification code each comprises a product identification code and a vendor identification code.

2. The method of sharing a configuration file according to claim 1, wherein after the embedded program running on the first host obtains the first public key, the method further comprises:

confirming whether the first public key exists in an identification code list by the embedded program; and connecting the embedded program to the server when the first public key exists in the identifier list, ending the embedded program when the first public key does not exist in the identification code list.

3. The method of sharing a configuration file according to claim 1, wherein after the embedded program running on the second host obtains the second public key, the method further comprises:

confirming whether the second public key exists in an identification code list by the embedded program; and connecting the embedded program to the server when the second public key exists in the identifier list, ending the embedded program when the second public key does not exist in the identification code list.

4. The method of sharing a configuration file according to claim 1, wherein after the embedded program is communicatively connected to the server according to the private key, the method further comprises:

providing a configuration file list, the configuration file including at least one configuration file stored in a public area and in the private area by the server.

5. The method of sharing a configuration file according to claim 1, wherein after the key is communicatively connected to the server, the method further comprises:
   providing the configuration file according to the product identification code of the second public key by the server, a list of the configuration file comprises a plurality of custom configuration files and at least one default configuration file, the custom configuration files and the default configuration file is applied to the second peripheral device and is located in the common area.

6. The method of sharing a configuration file according to claim 1, wherein the first peripheral device and the second peripheral device are a keyboard, a mouse, a touch pad or a webcam.

7. A method of sharing a configuration file, which is applicable to a first host and a second host that are communicatively connected to a network, and the method for sharing a configuration file comprises:
   electrically connecting to the first host by a first peripheral device and starting an embedded program with the first host;
   obtaining a public key of the first peripheral device by the embedded program;
   communicatively connecting to a server according to the public key by the embedded program;
   uploading or downloading a configuration file by using the embedded program after the first host is communicatively connected to the server, wherein the configuration file is located in a common area of the server;
   electrically separating the first peripheral device from the first host and electrically connecting a second peripheral device to the second host and starting the embedded program with the second host;
   obtaining the public key of the first peripheral device by the embedded program running by the second host;
   communicatively connecting the embedded program running on the second host to the server according to the public key; and
   downloading the configuration file by the embedded program, wherein the configuration file is located in a public area after the second host is communicatively connected to the server;
   wherein the public key is a hardware identification code of the first peripheral device, and the hardware identification code and comprises a product identification code and a vendor identification code.

8. The method of sharing a configuration file according to claim 7, wherein
   after the first host is communicatively connected to the server, the method further comprises: obtaining a private key from the server according to the public key by the embedded program;
   after obtaining the private key, the method further comprises: uploading or downloading another configuration file by the embedded program, wherein the another configuration file is located in a private area of the server;
   after the embedded program is started by the second host, the method further comprises: communicatively connecting the embedded program running on the second host to the server according to the private key; and
   downloading another list of the configuration file located in the private area by the embedded program after the second host communicatively connects to the server according to the private key.

9. A method for sharing a configuration file, which is applicable to a first host and a second host that are connected to a network, wherein the first host is electrically connected to a first peripheral device, and the second host is electrically connected to a second peripheral device, the method for sharing a configuration file comprises:
   starting an embedded program with the first host;
   obtaining a first public key of one of the first peripheral devices by the embedded program;
   communicatively connecting the embedded program to a server after obtaining the first public key;
   uploading or downloading a configuration file by the embedded program after the first host is communicatively connected to the server, wherein the configuration file is used to control the first peripheral device and the configuration file is located in a common area of the server;
   starting the embedded program by the second host after the configuration file is uploaded or downloaded by the embedded program;
   obtaining a second public key of the second peripheral device by the embedded program;
   communicatively connecting the embedded program to the server according to the public key after obtaining the second public key of the second peripheral device; and
   downloading the configuration file located in a public area by the embedded program after the second host is communicatively connected to the server;
   wherein the first public key is a hardware identification code of the first peripheral device, and the second public key is an another hardware identification code of the second peripheral device, and the hardware identification code and the another hardware identification code each comprises a product identification code and a vendor identification code.

10. The method of sharing a configuration file according to claim 9, wherein
   after the first host is communicatively connected to the server, the method further comprises: obtaining a private key from the server according to the public key by the embedded program;
   after obtaining the private key, the method further comprises: uploading or downloading another configuration file by the embedded program, wherein the another configuration file is located in a private area of the server;
   after the embedded program is started by the second host, the method further comprises:
   communicatively connecting the embedded program running on the second host to the server according to the private key; and
   downloading another configuration file located in the private area after the second host communicatively connects to the server by the embedded program according to the private key.

* * * * *